United States Patent [19]
Alberth et al.

[11] Patent Number: 6,094,565
[45] Date of Patent: Jul. 25, 2000

[54] CLOSEABLE COMMUNICATION DEVICE AND METHOD OF OPERATING THE SAME

[75] Inventors: William P. Alberth, Crystal Lake; Scott A. Steele, Lindenhurst; Patricia Ozaki, Lake Forest, all of Ill.

[73] Assignee: Motorola, Inc., Schaumburg, Ill.

[21] Appl. No.: 08/884,892

[22] Filed: Jun. 30, 1997

[51] Int. Cl.$^7$ .................................................. H04B 1/38
[52] U.S. Cl. ..................... 455/90; 455/566; 455/567; 455/575; 455/425; 379/433; 379/428
[58] Field of Search .............................. 455/90, 425, 556, 455/567, 557, 550, 465, 466, 415, 414, 565, 566

[56] References Cited

U.S. PATENT DOCUMENTS

| | | |
|---|---|---|
| D. 298,244 | 10/1988 | Watanabe . |
| 5,151,946 | 9/1992 | Martensson . |
| 5,369,788 | 11/1994 | Nagai . |
| 5,436,625 | 7/1995 | Kubo . |
| 5,442,814 | 8/1995 | Seo .......................................... 455/550 |
| 5,559,860 | 9/1996 | Mizikovsky ............................. 455/413 |
| 5,564,078 | 10/1996 | Nagai . |
| 5,584,054 | 12/1996 | Tyneski et al. .......................... 455/566 |
| 5,657,372 | 8/1997 | Ahlberg et al. .......................... 455/414 |
| 5,661,641 | 8/1997 | Shindo .................................... 361/814 |
| 5,668,867 | 9/1997 | Nagai ...................................... 379/433 |
| 5,687,218 | 11/1997 | Nakayama .............................. 455/415 |
| 5,732,347 | 3/1998 | Bartle et al. ............................. 455/421 |
| 5,742,894 | 4/1998 | Jambhekar et al. ........................ 455/90 |
| 5,809,414 | 9/1998 | Coverdale et al. ...................... 455/421 |
| 5,832,386 | 11/1998 | Nojima et al. ........................... 455/465 |
| 5,848,362 | 12/1998 | Yamashita ............................... 455/567 |
| 5,953,413 | 9/1999 | Peyer et al. .............................. 379/433 |

FOREIGN PATENT DOCUMENTS

| | | |
|---|---|---|
| 0473402 A2 | 3/1992 | European Pat. Off. . |
| 0588210 A1 | 3/1994 | European Pat. Off. . |
| 0678987 A1 | 10/1995 | European Pat. Off. . |
| 0726657 A1 | 8/1996 | European Pat. Off. . |
| 2 310 562 | 8/1997 | United Kingdom . |
| 2 310 568 | 8/1997 | United Kingdom . |
| WO94/13088 | 6/1994 | WIPO . |

OTHER PUBLICATIONS

Mitchell, K. "Method and Apparatus for Operating a Communication Device", U.S. Ser. No. 08/581,010, filed Jan. 3, 1996.

"StarTAC: Wearable Cellular Telephone, User Manual," Motorola, Inc., published Jan. 3, 1996, pp. 4–5, 12–13, 22–112.

*Primary Examiner*—Dwayne D. Bost
*Assistant Examiner*—Charles R Craver
*Attorney, Agent, or Firm*—Mark D. Patrick

[57] ABSTRACT

A closeable communication device (102), such as a cellular telephone, has a housing (105), an input device, such as a button (208), carried on the housing (105), and a controller (304) disposed in the housing (105) and coupled to the button (208). The housing (105) is movable between a closed position (200) and an opened position (114). The button (208) is accessible in the closed position (200). The controller (304) is configured to employ one or more features that increase the usability of the device (102) in the closed position (200). For example, the controller (304) answers an incoming call to the device (102) upon opening of the housing (105) and, alternatively, disables answering of the incoming call upon opening of the housing (105) during actuation of the button (208) so as to allow, for example, opening of the device (102) to view caller identification information without answering the call.

22 Claims, 3 Drawing Sheets

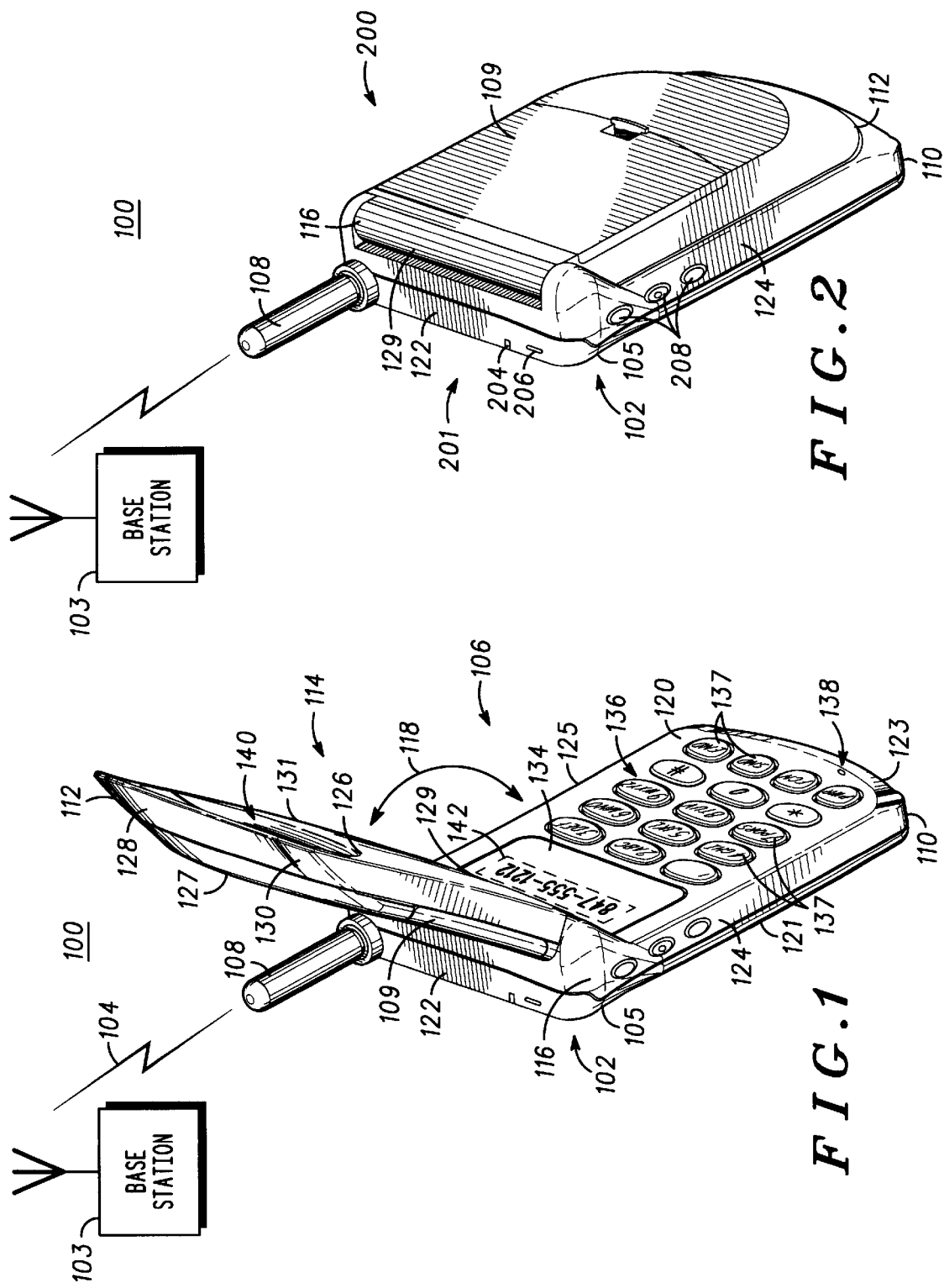

CLOSEABLE COMMUNICATION DEVICE AND METHOD OF OPERATING THE SAME

FIELD OF THE INVENTION

The present invention is generally related to communication devices and, more particularly, to a closeable communication device.

BACKGROUND OF THE INVENTION

Communication devices that are easy to transport, support desirable features, and minimize power consumption to extend the amount of time that they can be transported have a commercial advantage. One communication device that is easy to transport is a closeable cellular telephone having an opened position and a closed position. In the opened position, a conventional cellular telephone user interface of the cellular telephone, which includes a speaker, a microphone, a display, and a keypad, is fully exposed and the cellular telephone has a length that is sufficient to allow the ear and mouth of the user to align with the speaker and microphone, respectively. In the closed position, the conventional user interface is overlapped or collapsed thereby making the cellular telephone shorter in length. As an additional convenience, movement of the cellular telephone from the closed position to the opened position automatically answers an incoming telephone call. Thus, when a call is to be received or made, the cellular telephone is placed in the opened position to facilitate telephonic communication, and whenever a call is not being received or made, the cellular telephone is kept in the closed position to facilitate transport.

Although easy to transport, the closeable cellular telephone is not conducive to a caller identification feature ("caller ID") desired by many users. Caller ID permits a cellular telephone user to ascertain the calling party prior to answering an incoming call. A base station or other remote device providing service to the cellular telephone, sends the calling party's telephone number along with the incoming call to the cellular telephone. The cellular telephone displays the telephone number on the display for viewing by the viewer prior to answering the call. However, the display of a closeable cellular telephone is hidden in the closed position. Opening the cellular telephone to view the telephone number on the display automatically answers the call, thereby defeating the purpose of caller ID.

Also, the closeable cellular telephone does not minimize power consumption. When the cellular telephone is in the closed position, the user cannot view cellular telephone status information provided via the display. Such status information includes, for example, an indication as to whether the cellular telephone has service and whether the cellular telephone is roaming outside its home system. To provide the status information in the closed position, it is known to provide a display element, such as a multi-colored light emitting diode (LED), on the outside of the cellular telephone so as to be viewable while the cellular telephone is in the closed position. The LED continually emits red flashes to indicate that no service is available, yellow flashes to indicate roaming, and green flashes to indicate that service is available. Unfortunately, such continual flashing of the LED can reduce, by as much as 25 percent, the amount of time that the cellular telephone is on but not in a call.

Therefore, what is needed is a closeable communication device and method of operating the same that increases the usability of the device in the closed position by, for example, supporting desirable user features and minimizing power consumption.

BRIEF DESCRIPTION OF THE DRAWINGS

FIG. 1 is a perspective view illustrating a closeable communication device operating in a communication system, the closeable communication device in an opened position;

FIG. 2 is a perspective view illustrating the device of FIG. 1 in a closed position;

DETAILED DESCRIPTION OF THE PREFERRED EMBODIMENTS

Figure 3:
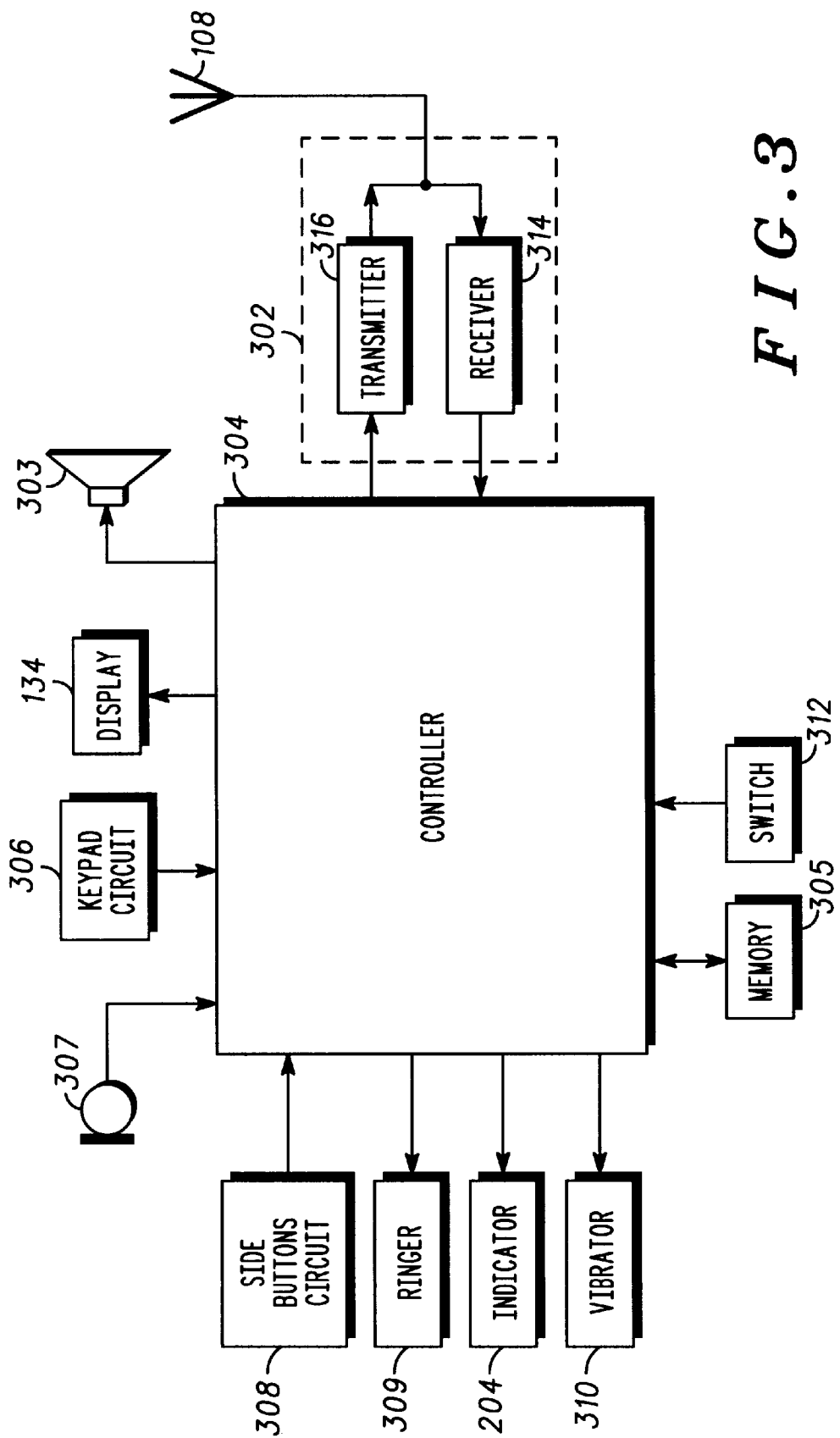
FIG. 3 is a circuit block diagram illustrating electrical circuitry of the device of FIG. 1.

A closeable communication device, such as a cellular telephone, has a housing, an input device, such as a button, carried on the housing, and a controller disposed in the housing and coupled to the button. The housing is movable between a closed position and an opened position. The button is accessible in the closed position. The controller is configured to employ one or more features that increase the usability of the device in the closed position. The controller, employing one feature, answers an incoming call to the device upon opening of the housing and, alternatively, disables answering of the call upon opening of the housing during actuation of the button so as to allow a user to view caller identification information without answering the call. To employ an additional feature, the device also has an output device, such as an indicator, coupled to the controller. The indicator remains deactivated until the controller detects actuation of the button when an incoming call is not present. Upon such detection, the controller activates the indicator to indicate status information for a limited duration. By employing a promptable indicator as such, rather than a continually active indicator, power consumption is minimized.

FIG. 1 shows a communication system 100 comprising a closeable communication device 102 and a base station 103. The device 102 and the base station 103 communicate via radio frequency (RF) signals 104 to provide wireless communications and features such as paging, telephone, and short messaging. Preferably, the device 102 is a cellular telephone, the base station 103 is a cellular base station that provides cellular telephone communications and additional communication services to the device 102, and the communication system 100 is a cellular telephone system. Although illustrated in a cellular telephone, the apparatus and method described hereinbelow will also find application in cordless telephones, two-way radios, pagers, personal digital assistants, and the like, and "device" as used herein shall refer to each of these and their equivalents.

The closeable communication device 102 has a housing 105, an antenna 108, and a battery 109. The antenna 108 is carried on the housing 105 to transmit and receive the RF signals 104 to and from the base station 103, respectively. The battery 109 is detachably coupled to the housing 105 to supply power to the device 102.

The housing 105 has housing portions 110 and 112. Housing portion 112 is movable between an opened position 114, such as that shown in FIG. 1, and a closed position 200, such as that shown in FIG. 2. Housing portion 112 is generally referred to as a movable element or a flap. In the illustrated embodiment, housing portions 110 and 112 are coupled via a hinge 116 providing a rotation for housing portion 112 to and from the opened and closed positions 114 and 200, as depicted by arrow 118. Alternatively, the housing portions 110 and 112 could be slidably coupled to provide the opened and closed positions 114 and 200.

Housing portion 110 has front and back surfaces 120 and 121, top and bottom surfaces 122 and 123, and right and left side surfaces 124 and 125. Each of the surfaces 122–125 extend between, and are generally perpendicular to, surfaces 120 and 121. Surfaces 120, 121, 124, and 125 are substantially similar in length and define the length of the device 102 in the closed position 200 of FIG. 2. The surfaces 122–125 of FIG. 1 are generally much smaller in width than a width of surfaces 120 and 121. In the illustrated embodiment, the length of surfaces 120, 121, 124, and 125 is about 85 mm, the width of surfaces 120 and 121 is about 50 mm, and the width of surfaces 122–125 is about 10 mm. Housing portion 112 is sized and shaped similarly to that of housing portion 110 and includes similarly defined surfaces 126–131. Sized and constructed as described above, the device 102 is sufficiently dimensionally constrained in the closed position 200 of FIG. 2 to be transported in a clothing pocket or in a belt holster.

A conventional cellular telephone user interface 106 is carried on the housing 105. The user interface 106 includes output devices, which are preferably a display 134 and a speaker 303 (see FIG. 3) positioned behind a speaker bezel 140, and input devices, which are preferably a keypad 136 and a microphone 307 (see FIG. 3) positioned behind a microphone aperture 138. The output devices of the user interface 106 are internally positioned to be detectable only when the housing 105 is in the opened position 114. The display 134 is carried on surface 120 of housing portion 110 and has a display area 142, which in FIG. 1 is shown to display the telephone number "847-555-1212." The speaker bezel 140 is carried on surface 126 of housing portion 112 at a distal end thereof to align with an ear of a user. The input devices of the user interface 106 are internally positioned to be accessible only when the housing 105 is in the opened position 114. The keypad 136 has a plurality of keys 137 carried on surface 120 of housing portion 110. The keys 137 are conventional alphanumeric telephone keys (0–9,*, and #) and conventional cellular telephone keys, such as a powered-on/off key (PWR), a function key (FCN), a send key (SND), and an end key (END). The microphone aperture 138 is formed in surface 120 of housing portion 110 at a distal end thereof to align with a mouth of a user.

An extended user interface 201, shown in FIG. 2, is carried on the housing 105 and is primarily for use when the housing 105 is in the closed position 200. The user interface 201 includes output devices, which are preferably an indicator 204 and a ringer 309 (see FIG. 3) positioned behind a ringer aperture 206, and input devices, which are preferably side buttons 208. The output devices of the user interface 201 are externally positioned to be detectable by a user when the housing 105 is in the opened position 114 of FIG. 1 and the closed position 200 of FIG. 2. The indicator 204 is carried on surface 122 of housing portion 110. The ringer aperture 206, which permits passage of sound waves, is formed in surface 122. The input devices of the user interface 201 are externally positioned to be accessible by a user when the housing 105 is in the opened and closed positions 114 and 200. The side buttons 208 are disposed on surface 124 of housing portion 110.

The closeable communication device 102 has electrical circuitry 300, as shown in FIG. 3. The electrical circuitry 300 includes the antenna 108, a transceiver 302, a controller 304, a memory 305, output devices of the user interfaces 106 of FIG. 1 and 201 of FIG. 2 including the speaker 303 of FIG. 3, the display 134, the ringer 309, the indicator 204, and a vibrator 310, and input devices of the user interfaces 106 and 201 including a keypad circuit 306, the microphone 307, a side buttons circuit 308, and a switch 312. All of the electrical circuitry 300 except the antenna 108 is directly coupled to the controller 304.

The transceiver 302 couples information between the base station 103 of FIG. 1 and the controller 304 of FIG. 3. The transceiver 302 is coupled to the antenna 108 and includes a receiver 314 and a transmitter 316. The receiver 314 receives the RF signals 104 of FIG. 1 through the antenna 108 and demodulates the RF signals 104. The demodulated information, which includes control information and can include voice information, is provided by the receiver 314 to the controller 304 as receive signals. The transmitter 316 receives transmit signals, which include control information and can include voice information, from the controller 304 for transmission. The transmitter modulates the signals and provides the modulated information to the antenna 108 for emission as the RF signals 104.

The output devices are controlled by the controller 304 to provide information to a user. The speaker 303 is driven by the controller 304 to output audible speech derived from the voice information in the signals provided by the receiver 314. The display 134 is driven by the controller 304 to display information derived from entries made via the keypad 136 of FIG. 1; to display information retrieved from the memory 305; to display information derived from the control information in the signals provided by the receiver 314, such as status information and caller identification information; or the like. The ringer 309 is driven by the controller 304 to sound an audible alert according to a predetermined tone pattern. The vibrator 310 is driven by the controller 304 to vibrate according to a predetermined vibration pattern and provide a tactile alert that is detectable when the housing 105 of FIG. 1 is in the opened position 114 of FIG. 1 and the closed position 200 of FIG. 2. The predetermined tone and vibration patterns can be selected according to a user's preference. The indicator 204 is driven by the controller 304 of FIG. 3 to flash or illuminate and provide a visual alert. The indicator 204 is preferably a multi-colored light emitting diode (LED), but can alternatively be any other suitable display element.

The controller 304 receives information from the user via the user input devices. The keypad circuit 306 provides signals to the controller 304 in response to actuations of the keys 137 of FIG. 1 of the keypad 136. The microphone 307 of FIG. 3 provides transduced audible speech signals to the controller 304. The side buttons circuit 308 provides signals to the controller 304 in response to actuation of any of the side buttons 208 of FIG. 2. The switch 312 of FIG. 3 provides signals to the controller 304 in response to the position of the housing 105 of FIG. 1. The switch 312 is a magnetic reedswitch or other suitable sensor or switch.

The memory 305 is a storage medium that is accessible by the controller 304. The memory 305 permanently stores operating instructions and user definable information, such as caller information in the form of an electronic phone book of names and associated telephone numbers entered by a user via the keypad 136 of FIG. 1, tone and vibration pattern selections entered by a user via the keypad 136, or the like. The memory 305 temporarily stores processed control information or the like. The memory 305 is preferably a combination of random-access memory (RAM), electrically-erasable programmable read-only memory (EEPROM), read-only memory (ROM), or other suitable memory device. Although shown separately, the memory 305 could alternatively be contained within the controller 304.

The controller 304 controls the electrical circuitry 300 as previously described according to the operating instructions stored in the memory 305. The controller 304 includes a microprocessor (not shown) for executing the operating instructions, processing the aforementioned received signals, and driving the electrical circuitry 300 in the aforementioned manner. The microprocessor is an 68HC11 microprocessor manufactured and sold by Motorola, Inc. or other suitable processing device.

Figure 4:
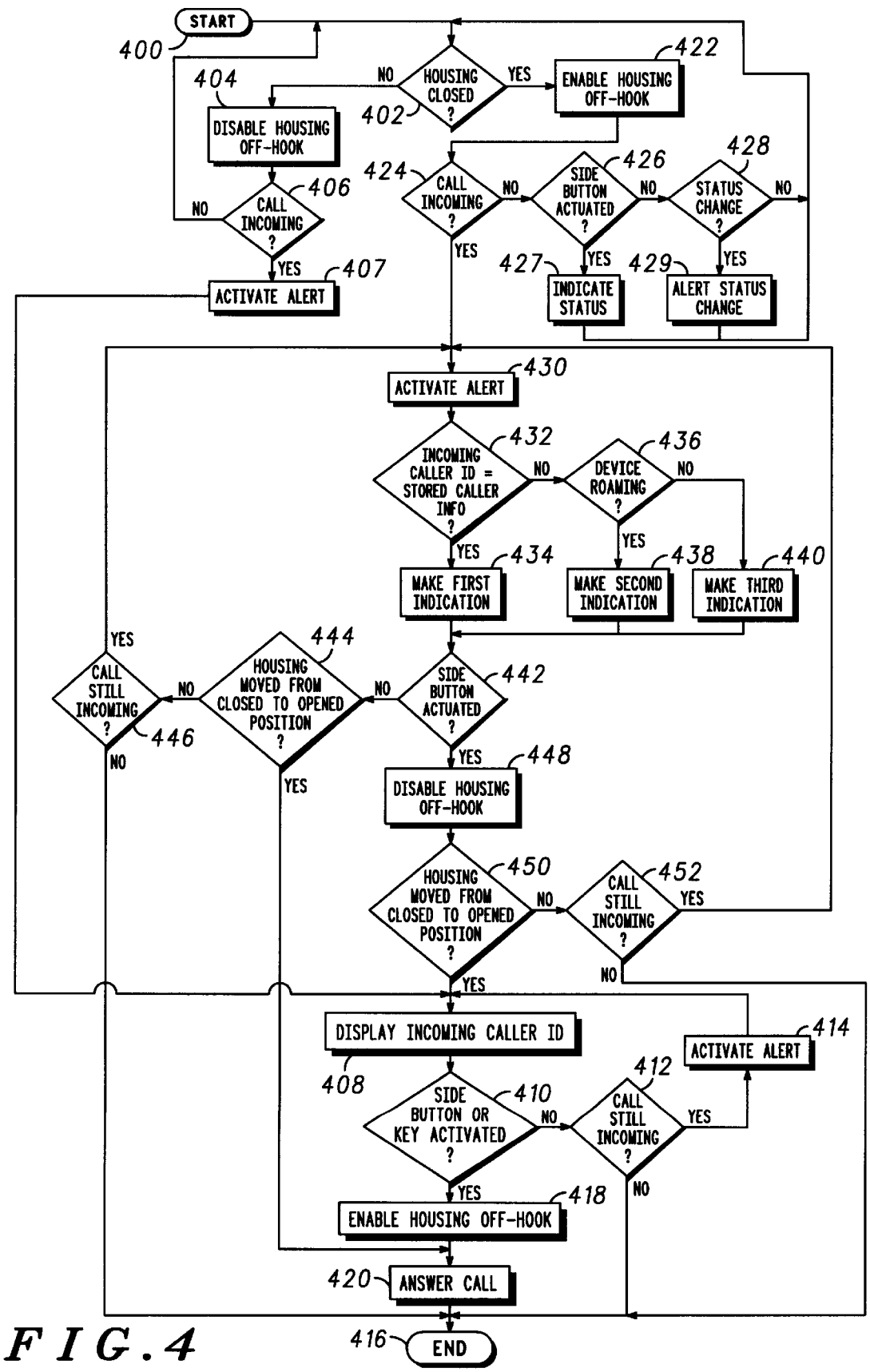
FIG. 4 is a flow chart illustrating a method of operating the device of FIG. 1.

One set of instructions executed by the controller 304 to control the electrical circuitry 300 is embodied in a plurality of method steps illustrated in FIG. 4. The method steps define features of the device 102, including functionality of the side buttons 208 of FIG. 2, and will be described in conjunction with FIGS. 1–4. The method is initiated when the device 102 enters a standby state of operation, that is, when the device 102 is powered-on but is not in a call (at step 400). When the device 102 enters the standby state, the output devices of the user interface 201 including the ringer 309, the indicator 204, and the vibrator 310 are deactivated. In the standby state, the controller 304 processes the signals from the switch 312 to determine if the housing 105 is in the closed position 200 (at step 402).

If the housing 105 is not in the closed position 200 (i.e., the housing 105 is in the opened position 114), the controller 304 disables application of the signals from the switch 312 so as to prevent housing controlled off-hook (i.e., so as to prevent answering of an incoming call while the housing 105 is in the opened position 114) (at step 404). The controller 304 then determines from the control information provided by the receiver 314 if a call to the device 102 is incoming (at step 406). If no call is incoming, the controller 304 returns to determine the position of the housing 105 (at step 402). If a call is incoming, the controller 304 activates the ringer 309, the vibrator 310, or the indicator 204 to alert a user to the incoming call (at step 407). The controller 304 then retrieves the caller identification information of the incoming call from the control information provided by the receiver 314 and drives the display 134 to display the caller identification information (at step 408). For example, if the telephone number of the originator of the incoming call is "847-555-1212", the display 134 would display the telephone number as shown in FIG. 1.

Next, the controller 304 monitors the side buttons circuit 308 and the keypad circuit 306 for a signal that, when processed, indicates actuation of one of the side buttons 208 or one of the keys 137, respectively (at step 410). If no such signal is found, the controller 304 processes the control information provided by the receiver 314 to determine if the call is still incoming (i.e., has not been terminated) (at step 412). If the call is still incoming, the controller 304 again activates the ringer 309, the vibrator 310, or the indicator 204 to provide an alert (at step 414) and returns to drive the display 134 to display the caller identification information (at step 408). If the call is no longer incoming (i.e., has been terminated), the controller 304 ends the method (at step 416). If the signal indicating actuation of one of the side buttons 208 or keys 137 is found, the controller 304 enables processing of the signals from the switch 312 to allow housing controlled off-hook (i.e., to allow answering of an incoming call while the housing 105 is in the opened position 114) (at step 418). Once enabled, the controller 304 answers the incoming call (at step 420) and ends the method (at step 416).

If the housing 105 is in the closed position 200, the controller 304 enables application of the signals from the switch 312 to allow housing controlled off-hook (i.e., to allow answering of an incoming call by moving the housing 105 from the closed position 200 to the opened position 114) (at step 422). The controller 304 then processes the control information provided by the receiver 314 to determine if a call to the device 102 is incoming (at step 424). If no call is incoming, the controller 304 monitors the side buttons circuit 308 for a signal that, when processed, indicates actuation of one of the side buttons 208 (at step 426).

If the signal indicating actuation of one of the side buttons 208 is found, the controller 304 performs a status check by controlling the indicator 204 to visually indicate the status of the device 102, as derived from the control information provided by the receiver 314 (at step 427). If the control information indicates that the base station 103 is providing service to the device 102 (i.e., the device 102 is "in service"), the controller 304 controls the indicator 204 to provide a first indication by flashing the color green. If the control information indicates that the device 102 has service but is geographically located outside its home communication system (i.e., the device 102 is "roaming"), the controller 304 controls the indicator 204 to provide a second indication different from the first indication by flashing the color yellow. If the control information indicates that the device 102 does not have service (i.e., the device 102 is "out of service"), the controller 304 controls the indicator 204 to provide a third indication different from the first and second indications by flashing the color red. The controller 304 preferably controls the indicator 204 to flash intermittently, such as on a 20 percent duty cycle at 0.5 Hz, for a short time period, such as 5 secs; however, the controller 304 could control the indicator 204 according to another suitable distinctive flashing pattern that minimizes the on-time of the indicator 204, yet facilitates visual perception of the status.

The controller 304 could alternatively use the ringer 309 or the vibrator 310 to provide the status check. To indicate status using the ringer 309, the controller 304 activates the ringer 309 for a short time period, such as 5 secs., and according to a distinctive tone pattern. For example, the controller 304 controls the ringer 309 to provide a 2113 Hz tone and a 2566 Hz tone alternating at a 25 Hz rate for 550 ms on/2600 ms off to indicate "in service," to provide a 2113 Hz tone and a 2566 Hz tone alternating at a 25 Hz rate for 1000 ms on/2000 ms off for "roaming," and to provide a 2500 Hz tone and a 2000 Hz tone alternating at a 8 Hz rate for 1000 ms on/1000 ms off to indicate "out of service." To indicate status using the vibrator 310, the controller 304 activates the vibrator 310 for a short time period, such as 5 secs., and according to a distinctive vibration pattern. For example, the controller 304 controls the vibrator 310 to make the first indication by repeatedly vibrating for 500 ms on/500 ms off to indicate "in service," for 2 secs. on/2 secs. off to indicate "roaming," and 250 ms on/250 ms off to indicate "out of service." Following the status check, the controller 304 returns to process the signals from the switch 312 (at step 402).

If the signal indicating actuation of one of the side buttons 208 is not found, the controller 304 performs a status change alert (at step 428). The controller 304 processes the control information provided by the receiver 314 to determine a current status of the device 102 and compares the current status to a previous status stored from the memory 305 (at step 402). If the current status matches the previously stored status (i.e., the status has not changed), the controller 304 returns to process the signals from the switch 312 (at step 402). If the current status does not match the previously stored status (i.e., the status has changed), the controller 304 controls the ringer 309, the vibrator 310, or the indicator 204 to alert a user as to the status change and overwrites the previous status in the memory 305 with the current status (at step 429). The ringer 309, the vibrator 310, and the indicator 204 are activated to provide distinctive tones, vibrations, and flashes, respectively, such as those described for the status check of step 427. Following the status change alert, the controller 304 returns to process the signals from the switch 312 (at step 402).

If a call to the device 102 is incoming while the housing 105 is in the closed position 200, the controller 304 activates the ringer 309, the vibrator 310, or the indicator 204 to alert a user to the incoming call (at step 430). Next, the controller 304 performs a smart call indication. The controller 304 retrieves the caller identification information of the incoming call from the control information provided by the receiver 314 and compares the caller identification information to caller information, such as telephone numbers, stored in the memory 305 (at step 432). If a match between the caller identification information and the stored caller information is found, the controller 304 controls the indicator 204 to make a first indication, such as by emitting green flashes (at step 434). If no match is found, the controller 304 determines from the control information provided by the receiver 314 if the device 102 is roaming (at step 436). If the device 102 is roaming, the controller 304 controls the indicator 204 to make a second indication different from the first, such as by emitting yellow flashes (at step 438). If no match is found and the device 102 is not roaming, the controller 304 controls the indicator 204 to make a third indication different from the first and second, such as by emitting red flashes (at step 440). The controller 304 preferably controls the indicator 204 to make the indications according to the aforementioned scheme described in relation to the status check of step 428. Rather than controlling the indicator 204, the controller 304 could alternatively control the ringer 309 or the vibrator 310 to perform the smart call indication by emitting distinctive tones or vibrations, such as those described for the status check of step 427.

Following the first, second, or third indication (at step 434, 438, or 440), the controller 304 monitors the side buttons circuit 308 for a signal that, when processed, indicates actuation of one of the side buttons 208 (at step 442). If the signal is not found, the controller 304 processes the signals from the switch 312 to determine if the housing 105 has been moved from the closed position 200 to the opened position 114 (at step 444). If the housing 105 has been moved, the controller 304 answers the incoming call (at step 420). If the housing 105 has not been moved, the controller 304 processes the control information provided by the receiver 314 to determine if the call is still incoming (i.e., has not been terminated) (at step 446). If the call is no longer incoming, the controller 304 ends the method (at step 416). If the call is still incoming, the controller 304 returns to alert the user (at step 430).

If the signal indicating actuation of one of the side buttons 208 is found, the controller 304 performs a housing off-hook disable by disabling application of the signals from the switch 312 so as to prevent housing controlled off-hook (i.e., so as to prevent answering of an incoming call while the housing 105 is in the opened position 114) (at step 448). Next, the controller 304 processes the signals from the switch 312 to determine if the housing 105 has been moved from the closed position 200 to the opened position 114 (at step 450). If the housing 105 has not been moved, the controller 304 processes the control information provided by the receiver 314 to determine if the call is still incoming (at step 452). If the call is no longer incoming, the controller 304 ends the method (at step 416). If the call is still incoming, the controller 304 returns to alert the user (at step 430).

If the housing 105 is moved while one of the side buttons 208 is actuated, the controller 304 drives the display 134 to display the caller identification information of the incoming call (at step 408) and performs the remaining steps 410, 412, 414, 416, 418, and/or 420 in the manner previously described.

The check status function embodied in steps 402, 424, 426, and 427 of the method of FIG. 4, which requires a user to prompt the device 102 for status information when the housing 105 is in the closed position 200, allows the device 102 to operate in the standby state approximately 25 percent longer than prior art devices that continuously provide status information. This is demonstrated by the following example. Assume the device 102 and the prior art device share the following characteristics: the battery 109 is a lithium cell battery with a capacity of 1512000 mA*secs.; the electrical circuitry 300 aside from the indicator 204 has a current drain of 3 mA while operating in the standby state; and the indicator 204 is an LED drawing 5 mA of current when active and adds 1 mA to the current drain in the standby state when active on a 20 percent duty cycle. The prior art device, which employs a continuously active LED, operates in the standby state for 378000 secs. (1512000 mA*secs./(3 mA+1 mA)) The device 102, which employs an LED that may never be activated in the standby state if the user so chooses, operates in the standby state for 504000 secs. (1512000 mA*secs./3 mA), which is 25 percent ((504000 secs.–378000 secs. )/504000 secs.)*100 percent) longer than the prior art device can operate in the standby state. Even assuming that a user of the device 102 performs a status check four times an hour and the LED flashes on a 20 percent duty cycle for 5 secs., the device 102 still operates in the standby state for approximately 503067.6 secs. (1512000mA*secs./[(3 mA*(3580 secs./3600 secs.))+(4 mA *4* (5 secs./3600 secs.))], which is 24.8 percent ((503067.6 secs.–378000 secs.)/504000 secs.) *100 percent) longer than the prior art device can operate in the standby state.

The status change alert feature embodied in steps 402, 424, 428, and 429 of the method of FIG. 4, which automatically alerts the user to a change in status of the device 102 when the housing 105 is in the closed position 200, allows the device 102 to operate in the standby state longer than prior art devices that continuously provide status information. By alerting a user to the status of the device 102 only when the status changes, use of the continuously active LED employed by prior art devices is avoided and length of operation in the standby state is extended for the reasons stated with respect to the check status feature.

The smart call feature embodied in steps 402, 424, 430, 432, 434, 436, 438, and 440 of the method of FIG. 4 provides a user with incoming call information when the housing 105 is in the closed position 200. Because a monetary cost is typically incurred by the party that receives a call on the device 102, a user can beneficially use this feature to screen incoming calls. This feature permits screening on a broad level whereby those incoming calls with caller identification information matching any caller information stored in the memory 305 triggers the first indication of step 434. Alternatively, screening can be on a narrow level whereby the user can flag only the caller information stored in the memory 305 that defines a particular party so that only an incoming call from that particular party will trigger the first indication of step 434.

The housing off-hook disable feature embodied in steps 402, 422, 424, 442, 448, 450, 408, 410, 418, and 420 of the method of FIG. 4 allows a user to selectively prevent answering of an incoming call to the device 102 when the housing 105 is moved from the closed position 200 to the opened position 114. This allows the user to view caller identification information of the incoming call on the display 134 of the device 102, which is hidden in the closed position 200, without answering the call. This is an advance over prior art devices that, in a closed position, have a hidden display and that automatically answer the incoming call upon opening of the housing, thereby providing no opportunity for viewing of caller identification information before the call is answered. Aside from viewing caller identification information, the off-hook disable feature also allows a user to open the housing 105 to access to other features, such as an answering machine feature, a call forwarding feature, or the like, without answering an incoming call.

Although the user interfaces of the closeable communication device are shown to employ particular input devices, such as a keypad and side buttons, one skilled in the art will recognize that such input devices could alternatively be implemented using switches, sensors, softkeys, touch sensitive pads, voice recognition/transcription devices, or the like. Although the user interfaces of the closeable communication device are shown to employ particular output devices, such as a display, an indicator, a ringer, and a vibrator, one skilled in the art will recognize that such output devices could alternatively be implemented using voice synthesizers or the like.

Thus it can be seen that a closeable communication device can employ features that increase its usability in the closed position. Such features include a user-promptable status check, which extends the operating time of the device while it is in the closed position, and a selective housing off-hook disable, which permits opening of the device without answering an incoming call. By employing such features, the closeable communication device can be operated in the closed position, where it is easily transported, for longer periods of time.

What is claimed is:

1. A closeable communication device for at least receiving an incoming call, the closeable communication device being a wireless communication device operable to communicate via radio frequency signals, the closeable communication device comprising:
   a housing movable between a closed position and an opened position;
   a button carried on the housing, the button being accessible for actuation when the housing is in the closed and opened positions;
   a display positioned on the housing, the display hidden when the housing is in the closed position, the display detectable for viewing when the housing is in the opened position; and
   a controller disposed in the housing and coupled to the button and the display, the controller, responsive to detection of the incoming call, to answer the incoming call upon movement of the housing from the closed position to the opened position and, alternatively, to disable answering of the incoming call upon movement of the housing from the closed position to the opened position during actuation of the button, thereby, permitting viewing of the display without answering the incoming call.

2. A closeable communication device according to claim 1 wherein the controller drives the display to display information associated with the incoming call.

3. A closeable communication device according to claim 2 wherein the information is caller identification information.

4. A closeable communication device according to claim 1 further comprising a keypad carried on the housing and coupled to the controller, the keypad accessible for actuation when the housing is in the opened position and inaccessible for actuation when the housing is in the closed position; and
   wherein the button is a side button.

5. A closeable communication device according to claim 1 further comprising a status indication device carried on the housing and coupled to the controller, the status indication device detectable when the housing is in the closed position; and
   wherein the controller controls the status indication device to provide one of an in service status indication, an out of service status indication and a roaming status indication in response to actuation of the button when an incoming call is not detected.

6. A closeable communication device according to claim 5 wherein the status indication device is one of a visual indicator, a ringer, and a vibrator.

7. A closeable communication device according to claim 1 further comprising:
   a receiver to receive status information indicating operating status of the closeable communication device, the status information indicating one of in service status, out of service status and roaming status:
   a status indication device coupled to the controller, the status indication device detectable in the closed position, and
   a memory disposed in the housing and coupled to the controller, the memory to store previous status information; and
   wherein the controller is coupled to the receiver, the status indication device and the memory, the controller controls the status indication device to provide a status alert when present status information does not match the previous status information stored in the memory and an incoming call is not detected.

8. A closeable communication device according to claim 7 wherein the status indication device is one of a visual indicator, a ringer, and a vibrator.

9. A closeable communication device for at least receiving an incoming call while operating in a standby state, the closeable communication device being a battery-powered wireless communication device operable to communicate via radio frequency signals, the closeable communication device comprising:
   a housing movable between a closed position and an opened position;
   an input device carried on the housing and accessible when the housing is in the closed position;
   a display carried on the housing, at least a portion of the display hidden when the housing is in the closed position:
   a status indication device carried on the housing and detectable when the housing is in the closed position; and
   a controller disposed in the housing and coupled to the input device, the display and the status indication device, the controller to control the status indication device to indicate operating status of the closeable communication device upon actuation of the input device when the incoming call is not detected, thereby, minimizing power consumption and extending operation of the closeable communication device in the standby state.

10. A closeable communication device according to claim 9 wherein the status indication device is controlled to indicate one of an in service status indication, an out of service status indication and a roaming status indication.

11. A closeable communication device according to claim 10 wherein the status indication device is one of a visual indicator, a ringer, and a vibrator.

12. (New) A closeable communication device according to claim 11 wherein the status indication device is the visual indicator, and the controller controls the visual indicator to intermittently flash a first color to provide the in service status indication, intermittently flash a second color different from the first color to provide the out of service status indication and intermittently flash a third color different from the first and second colors to provide the roaming status indication.

13. A closeable communication device according to claim 11 wherein the status indication device is the ringer, and the controller controls the ringer to alternate first and second tones at a first rate during a first time period to provide the in service status indication, alternate the first and second tones at the first rate during a second time period to provide the roaming status indication and alternate third and fourth tones at a second rate during a third time period to provide the out of service status indication.

14. A closeable communication device according to claim 11 wherein the status indication device is the vibrator, and the controller controls the vibrator to vibrate according to a first vibration pattern to provide the in service status indication, to vibrate according to a second vibration pattern different from the first vibration pattern to provide the roaming status indication and to vibrate according to a third vibration pattern different from the second and third vibration patterns to provide the out of service status indication.

15. A closeable communication device according to claim 9 further comprising a memory disposed in the housing and coupled to the controller, the memory to store previous status information; and wherein the controller controls the status indication device to indicate operating status of the closeable communication device when present status information does not match the previous status information stored in the memory.

16. A closeable communication device according to claim 15 wherein the controller controls the status indication device to indicate operating status of the closeable communication device only when present status information does not match the previous status information stored in the memory.

17. A closeable communication device according to claim 9 wherein the controller controls the status indication device to indicate operating status of the closeable communication device only upon actuation of the input device when an incoming call is not detected.

18. A method of operating a closeable communication device the closeable communication device being a wireless communication device operable to communicate via radio frequency signals, the closeable communication device having a closed position and an opened position, the method comprising the steps of:

detecting an incoming call to the closeable communication device;

detecting actuation of a button of the closeable communication device;

disabling, responsive to detecting actuation of the button, answering of the incoming call detecting movement of the closeable communication device from the closed position to the opened position, and controlling a display of the closeable communication device to display information associated with the incoming call.

19. A method according to claim 18 further comprising the step of retrieving caller identification information from the incoming call; and wherein the step of controlling comprises the step of controlling the display to display the caller identification information.

20. A method according to claim 18 further comprising the steps of:

detecting, responsive to disabling, actuation of one of the button and a keypad of the closeable communication device;

enabling answering of the incoming call to the closeable communication device; and answering the incoming call.

21. A method according to claim 18 further comprising the steps of:

detecting actuation of the button when an incoming call is not detected; and controlling, responsive to detecting actuation of the button when an incoming call is not detected, a status indication device of the closeable communication device to indicate operating status of the closeable communication device.

22. A method according to claim 18 further comprising the steps of:

detecting status information;

comparing present status information to prestored status information; and controlling a status indication device of the closeable communication device to provide a status alert when the present status information and the prestored status information do not match and an incoming call is not detected.

* * * * *